Figure 1:
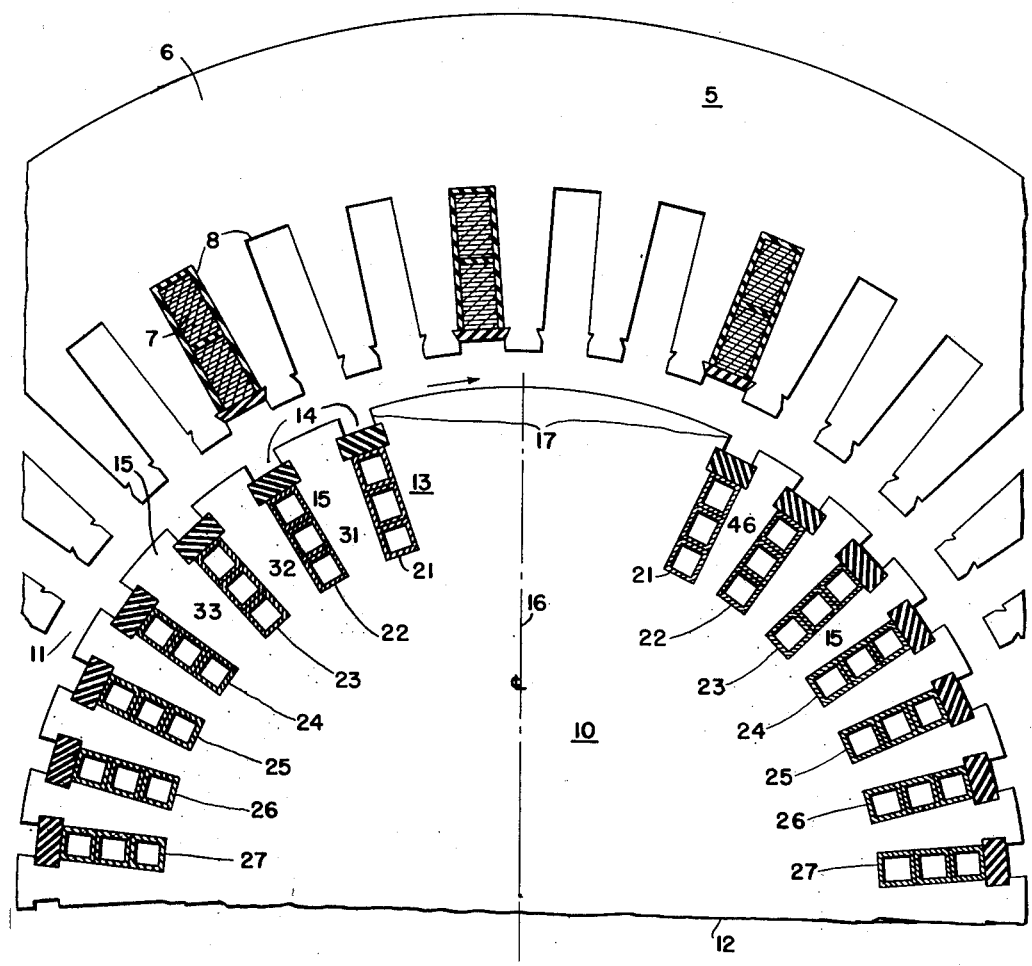

May 25, 1954     L. A. KILGORE     2,679,605
ASYMMETRICAL GENERATOR ROTOR

Filed July 26, 1952     2 Sheets-Sheet 1

WITNESSES:

INVENTOR
Lee A. Kilgore.
BY
ATTORNEY

May 25, 1954

L. A. KILGORE 2,679,605

ASYMMETRICAL GENERATOR ROTOR

Filed July 26, 1952

2 Sheets-Sheet 2

WITNESSES:

*John E. Hensley*
*Nw. L. Groove*

INVENTOR
Lee A. Kilgore.
BY *O. B. Buchanan*
ATTORNEY

Patented May 25, 1954

2,679,605

UNITED STATES PATENT OFFICE 2,679,605

ASYMMETRICAL GENERATOR ROTOR

Lee A. Kilgore, Export, Pa., assignor to Westinghouse Electric Corporation, East Pittsburgh, Pa., a corporation of Pennsylvania Application July 26, 1952, Serial No. 301,031

1 Claim. (Cl. 310—111)

My invention relates to means for improving the performance of turbine generators, and it has particular relation to an asymmetric disposition of the rotor-slots of such machines. Turbine generators are large high-speed synchronous machines, usually having two poles, sometimes four poles. The rotor member is invariably the field member, and it invariably has a solid cylindrical rotor-core having winding-receiving slots for receiving the coil-sides of a plurality of concentric-type coils spanning the pole-centers of the respective poles.

There is a difficulty, in connection with such machines, which has not heretofore been discovered because of the methods which are in common use for analyzing or predetermining the generator performance. The computation-difficulties which confront the design-engineer, in connection with such machines, are quite formidable, usually requiring empirical design-methods, usually involving the Potier reactance, which is a synchronous-machine quantity, determined from the no-load saturation-curve and an over-excited condition at zero power factor. This is useful in the calculation of the excitation of the machine at other loads and power factors.

I have discovered, however, that if we study the full-load field-form, taking into consideration the saturation of the rotor-teeth, we find a sharp dissymmetry in the field-flux form, in which there appears a sharp discontinuity due to the saturation of the rotor-teeth which trail or follow the center-line of the pole during the rotation of the rotor member, as a result of the armature reaction of the generator. This effect is especially pronounced in certain modern machines in which wider rotor-slots are needed, in order to accommodate aluminum windings, rather than copper windings, or to accommodate innercooling ducts in the rotor-slots or hollow motor conductors.

This saturation of the rotor-teeth next to the pole center, on one side of said pole center, not only results in a loss of the useful or airgap flux, but it also results in extra pulsation-losses in the stator-teeth, and extra resistance-losses or heating in the stator-conductors, caused by crossslot flux which fringes across the stator-slots, thus increasing the stator-winding temperature and reducing the permissible stator-winding rating.

Figure 2:
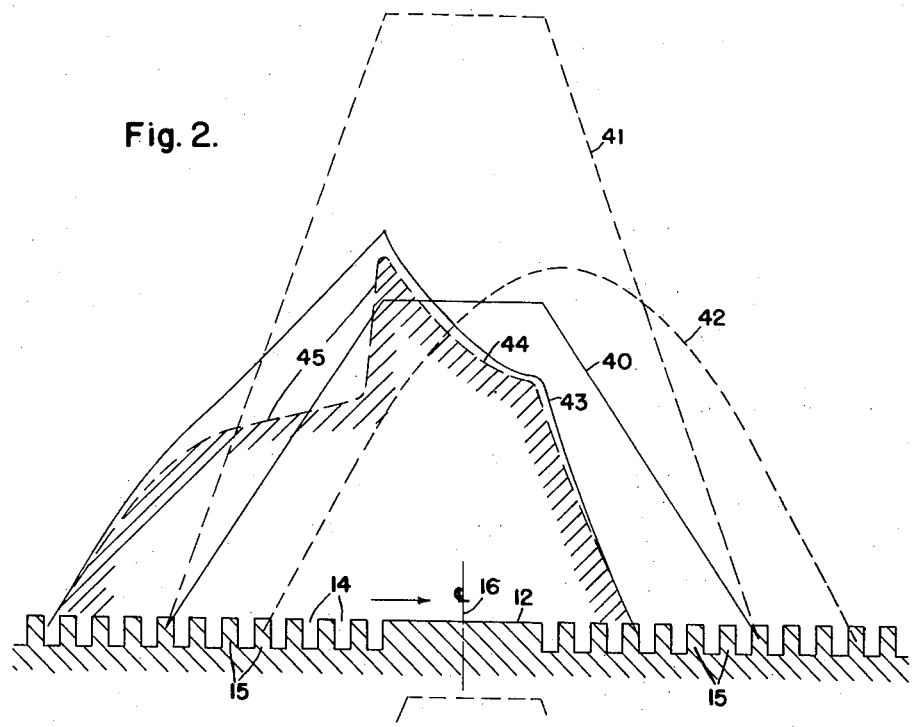
Figure 3:
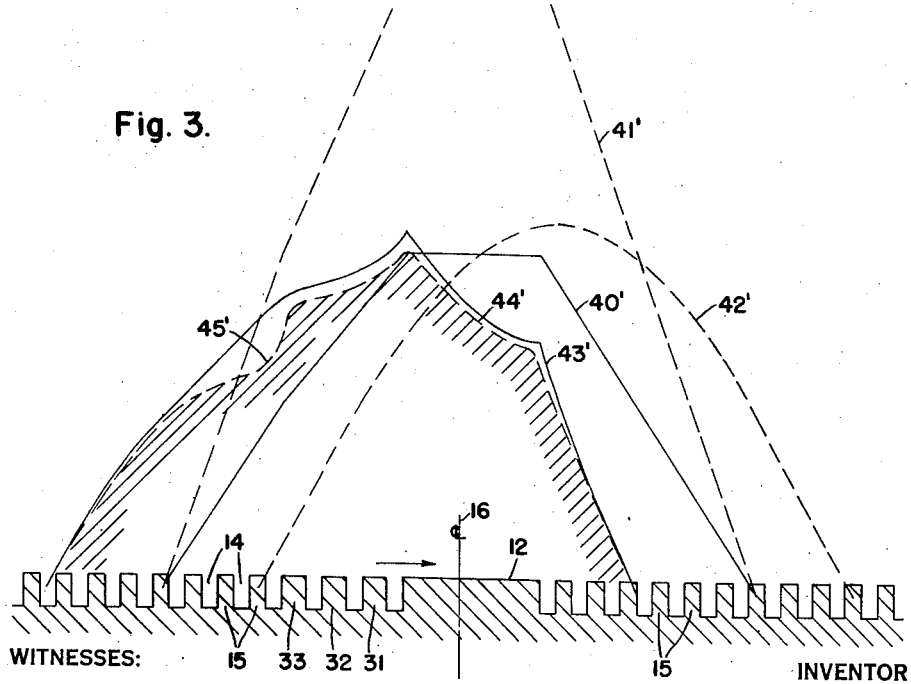

These effects are greatly minimized, in my present invention, by widening a few of the rotor-slots next to the pole-center, as will be subsequently explained, with reference to the accompanying drawing, wherein:

Figure 1 is a fragmentary cross-sectional end-view of a synchronous generator embodying my invention, and Figs. 2 and 3 are field-form diagrams showing the difference between the old symmetrical rotor-construction and my new asymmetrical construction.

In Fig. 1, I show only a fragment of a two-pole synchronous generator, or other dynamoelectric machine, comprising a stationary armature-member 5 having an annular stator-core 6 and alternating-current armature-winding 7 which is carried in slots 8 in the stator-core. The machine has a rotating field-member 10, which is separated from the stator-core 6 by an airgap 11. The field-member 10 comprises a cylindrical rotor-core 12, and a distributed direct-current field-winding 13 which is carried by a plurality of winding-receiving rotor-slots 14 in the rotor-core 12. These rotor-slots 14 are separated by rotor-teeth 15, and they are disposed on each side of the center-line 16 of each rotor-pole, leaving each rotor-pole with a pole-center region 17 having no winding-receiving slots. The field-winding 13 for each rotor-pole comprises a plurality of concentric-type coils 21 to 27 which span the pole-center and have soil-sides lying within the respective rotor-slots.

In accordance with my invention, I make the rotor slot-and-tooth arrangement asymmetric, on the side of each pole which follows the center-line 16 during the rotation of the rotor-core, when the machine is operating as a generator. This asymmetry consists of moving-in several of the winding-receiving rotor-slots 14, on this side of the center-line of the pole, thus resulting in a widening of several of the rotor-teeth 15, or a wider tooth-span of a plurality of rotor-teeth closest to said center-line, as indicated at 31, 32 and 33. In this way, the coil-pitches (or the spans between the two coil-sides) of the innermost coils, such as the coils 21, 22 and 23 (usually amounting to not more than half of the total number of coils per pole), are shortened and displaced relative to the center-line 16 of the remaining coils (such as the coils 24 to 27), of that pole.

The operational effect of my invention will best be understood by a comparison of the diagrams which comprise Figs. 2 and 3. Fig. 2 shows the distortion of the full-load field-form, with the usual symmetrical rotor-slot arrangement. The no-load field-magnetomotive force is indicated at 40, and the full-field magnetomotive force is indicated at 41. The full-load armature-magnetomotive force, representing the armature reaction, is indicated at 42, this magnetomotive force being reversed, so as to get it on the diagram conveniently, it being understood that this armature-magnetomotive force opposes the field-magnetomotive force in the leading half of the pole-field. The resultant effective or total full-load full-field magnetomotive force is indicated at 43, from which it will be seen that the flux-density in the trailing rotor-teeth 15 is much higher than on the leading side of the center-line 16 of the pole. This causes a tooth-saturation which produces an airgap flux 44 having therein a sharp dip 45 which not only reduces the total airgap flux of the pole, but also produces undesirable stator-losses as has previously been described.

Fig. 3 shows the effect of my invention, in widening some of the rotor teeth, as indicated at 31, 32 and 33, on the trailing side of the rotor-pole center 16. The various curves in Fig. 3 are given the same numbers, with primes added to the corresponding curve-numberings in Fig. 2. It will readily be seen that the effect of rotor-tooth saturation is reduced, in Fig. 3, because of the greater width or tooth-spans of the widened rotor-teeth, thus resulting in an airgap flux 44' which has a much smaller dip 45', which is much less sudden in its flux-changing effect.

The tooth-width which is commonly used, in calculating tooth-saturation is the tooth-width at the point one-third of the way up from the base of the tooth, as indicated at 46 in Fig. 1. In a typical machine, with a maximum fundamental flux-density of about 60,000 lines of force per square inch at the rotor surface, the tooth-width 46 at a point one-third of the way up from the base of the tooth should be about 40% of the slot-pitch at the surface, thus giving a tooth-flux density of 150,000 lines of force, which is about all that can be carried without excessive saturation.

To have used a symmetrical construction, at the same time making the first three teeth on both sides of the pole-center 16 wide enough to avoid excessive saturation, would have reduced the width of the unslotted pole-center region 17 by several inches, in a typical machine, thus increasing the saturation of this pole-center portion 17, as well as reducing the effectiveness of the inner coil 21 next to the pole-center, by 16% (for example). However, by using an asymmetrical construction, and widening the first few rotor-teeth, only on the trailing side of the pole-center (when the machine is operating as a generator), I avoid unnecessarily reducing the width of the pole-center region 17, thus obtaining a good field-form 44' under full load, as indicated in Fig. 3, without serious loss of the fundamental flux, and without serious extra stator-losses due to a sharp break in the field-form, as initiated at 45 in Fig. 2.

While I have illustrated my invention in only one exemplary form of embodiment, I wish it to be understood, of course, that I am not limited to the precise structural details and dimensions which have been illustrated.

I claim as my invention:

A synchronous dynamo-electric machine comprising a stationary armature-member having an annular stator-core and an alternating-current armature-winding carried by said stator-core, and a rotating field-member having a cylindrical rotor-core and a distributed direct-current field-winding carried by said rotor-core, said rotor-core having a plurality of winding-carrying rotor-slots, separated by rotor-teeth, disposed on each side of the center-line of each rotor-pole, leaving each rotor-pole with a pole-center region having no winding-receiving slots, the field-winding for each rotor-pole comprising a plurality of concentric-type coils spanning the pole-center and having coil-sides lying within the respective rotor-slots, characterized by the rotor slot-and-tooth arrangement being asymmetric on the side of each pole which follows the center-line when the machine is operating as a generator, said asymmetry consisting of a tooth span of a plurality of rotor-teeth closest to said center-line on said following side, wider than the tooth-span of a plurality of the rotor-teeth nearest the center-line on the leading side thereof, whereby the coil-pitches of the innermost coils are shortened and displaced relative to the center-line of the remaining coils of that pole.

No references cited.